United States Patent [19]

Huang

[11] Patent Number: 5,195,340
[45] Date of Patent: Mar. 23, 1993

[54] PADLOCK DEVICE LOCKABLE BY PUSHING

[75] Inventor: Tzong-Chyuan Huang, Kaohsiung Hsien, Taiwan

[73] Assignee: Chang-Jie Industrial Co., Ltd., Feng-Shan, Taiwan

[21] Appl. No.: 847,197

[22] Filed: Mar. 6, 1992

[51] Int. Cl.$^5$ ............................................. E05B 67/22
[52] U.S. Cl. ........................................ 70/38 A; 70/39; 70/53; 70/238; 70/360; 70/491
[58] Field of Search ................... 70/38 R, 38 A, 38 C, 70/39, 52, 53, 209, 226, 238, 360, 491

[56] References Cited

U.S. PATENT DOCUMENTS

| | | | |
|---|---|---|---|
| 957,705 | 5/1910 | Nerhaft | 70/38 A |
| 1,395,970 | 11/1921 | Nidermaier | 70/226 |
| 3,823,584 | 7/1974 | Gill | 70/52 X |
| 3,990,280 | 11/1976 | Jahn | 70/238 |
| 4,241,594 | 12/1980 | Miller et al. | 70/52 X |
| 4,918,949 | 4/1990 | Newbold | 70/38 A |
| 5,133,203 | 7/1992 | Huang | 70/491 X |

FOREIGN PATENT DOCUMENTS

| | | | |
|---|---|---|---|
| 428747 | 5/1926 | Fed. Rep. of Germany | 70/39 |
| 530944 | 7/1955 | Italy | 70/38 A |
| 862007 | 3/1961 | United Kingdom | 70/38 R |
| 2238519 | 6/1991 | United Kingdom | 70/238 |

Primary Examiner—Lloyd A. Gall
Attorney, Agent, or Firm—Christie, Parker & Hale

[57] ABSTRACT

A lock device includes a hollow cylindrical rod body with two retaining holes. The rod body has a closed end and an open end. A key plug assembly includes a tubular outer housing fixed in the open end of the rod body, and a push rod extending through the outer housing and movable in the outer housing between an unlocking position, where a portion of the push rod extends from the outer end of the outer housing, and a locking position, where the push rod extends from the inner end of the outer housing. In the rod body, a resilient element pushes a locking plate assembly toward the key plug assembly. When the push rod is pushed inward and is locked in the locking position in the outer housing, the resilient element is compressed between the locking plate assembly and the end wall of the rod body so that two notched lock bars extend through the retaining holes and the small-sized portions of the locking holes in the locking plate assembly, thereby preventing removal of the lock bars from the rod body. When an associated key is inserted into the open end of the rod body and is operated so that the push rod is unlocked from the outer housing, the resilient element pushes the push rod to the unlocking position so as to engage the lock bars within the large-sized portions of the locking holes, thereby allowing the lock bars to be removed from the rod body.

4 Claims, 8 Drawing Sheets

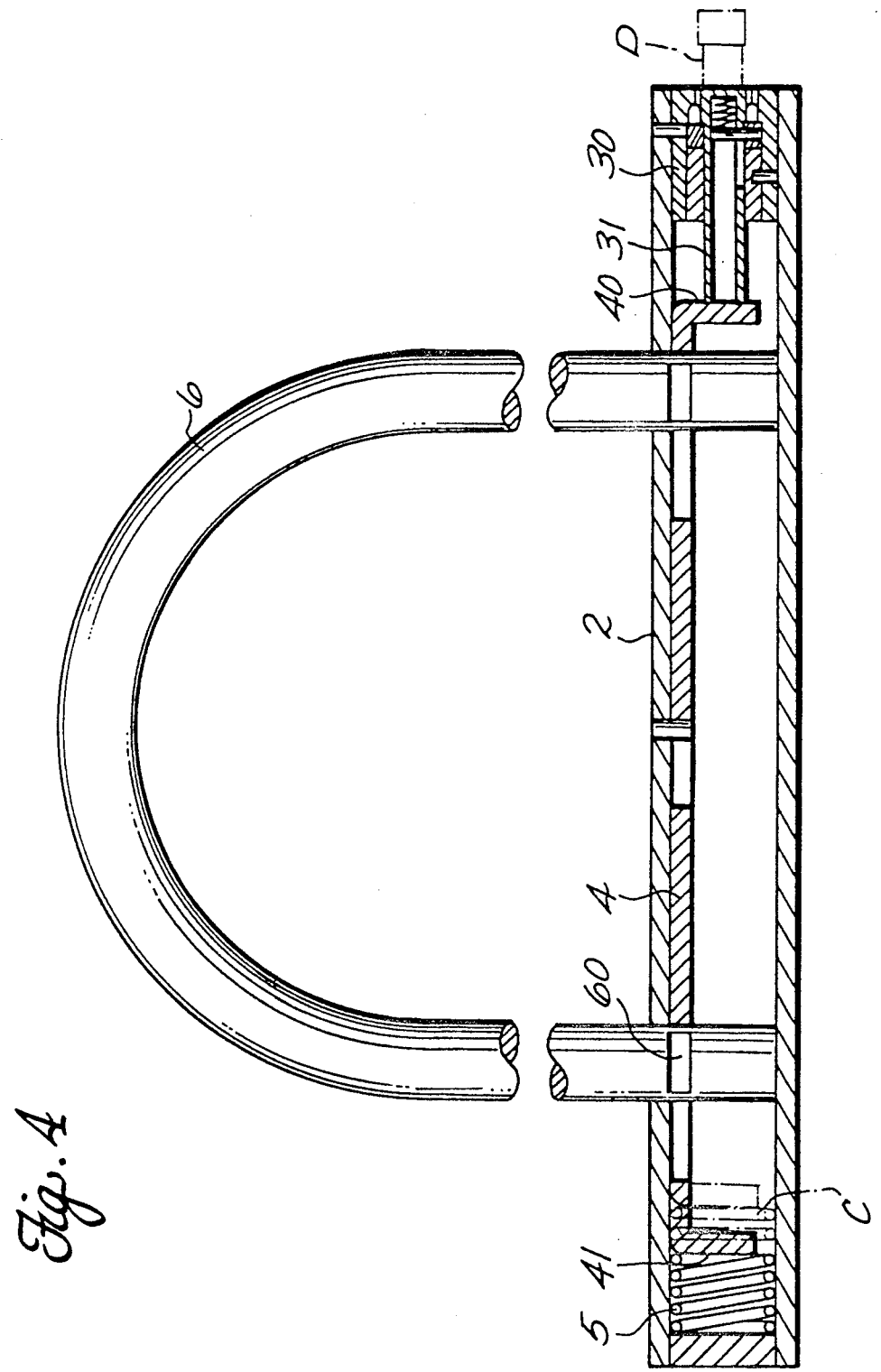

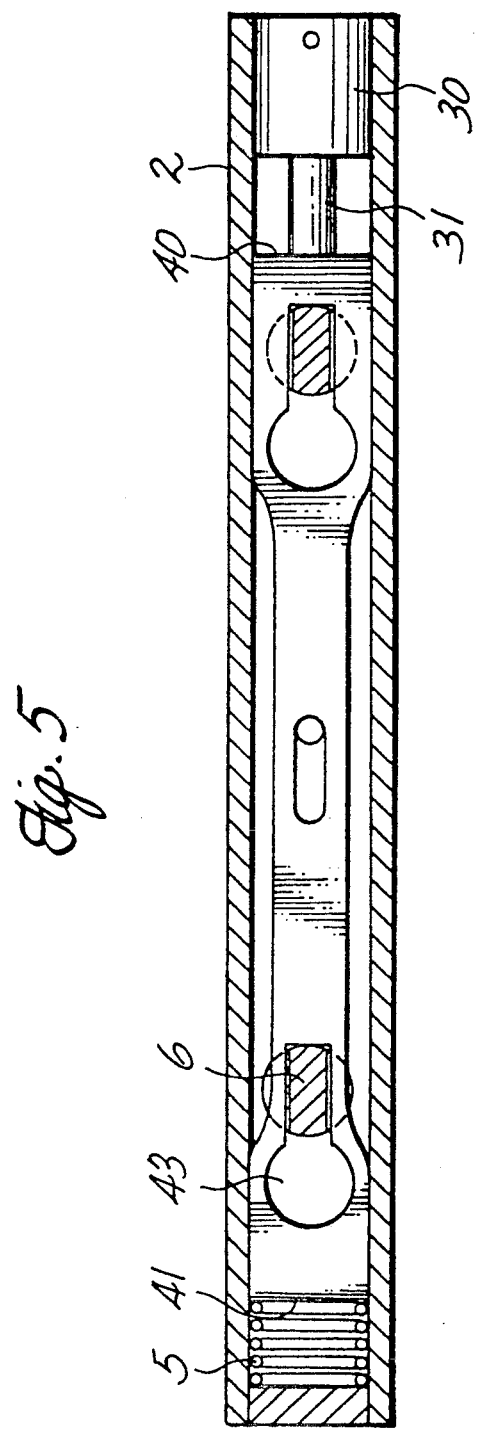

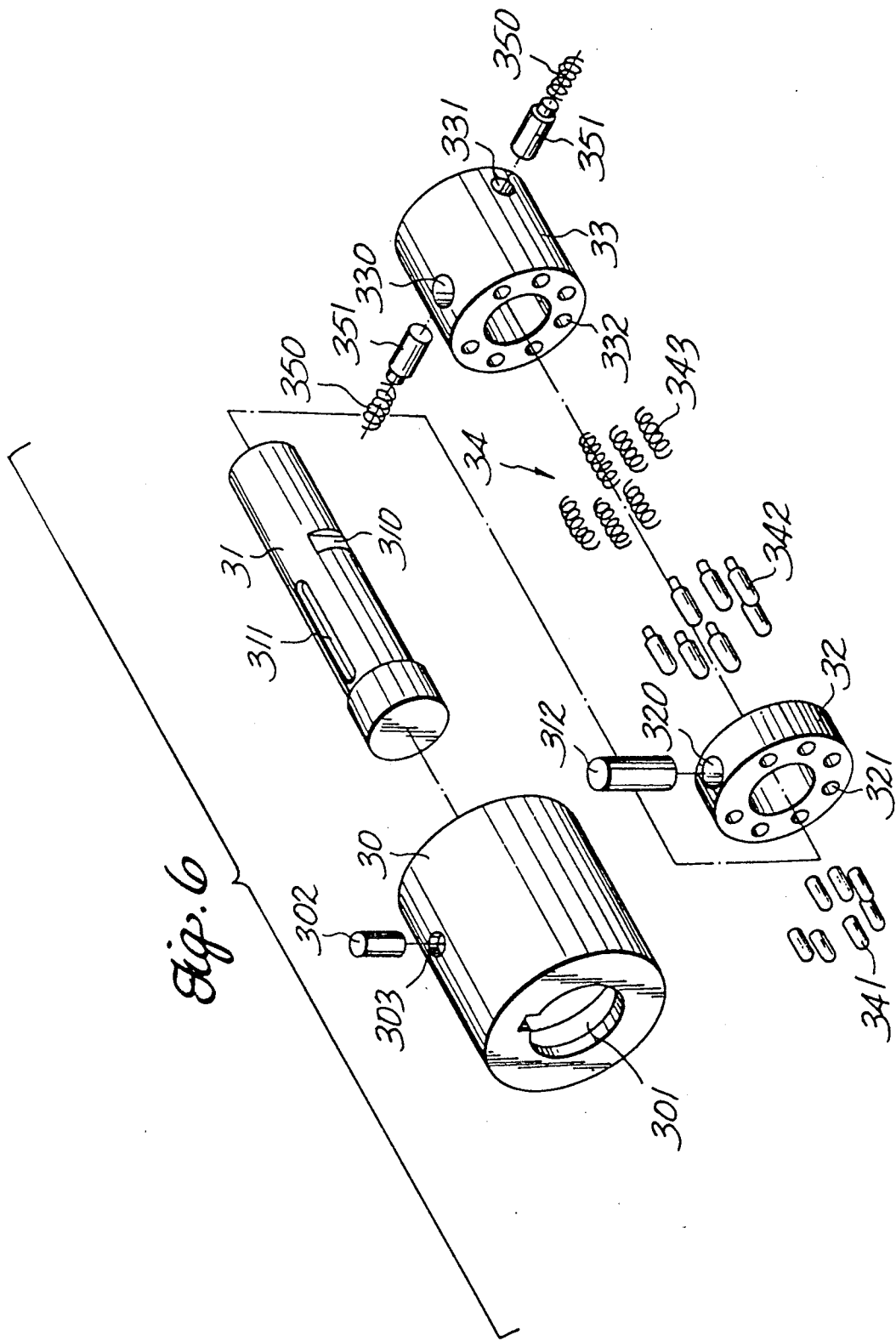

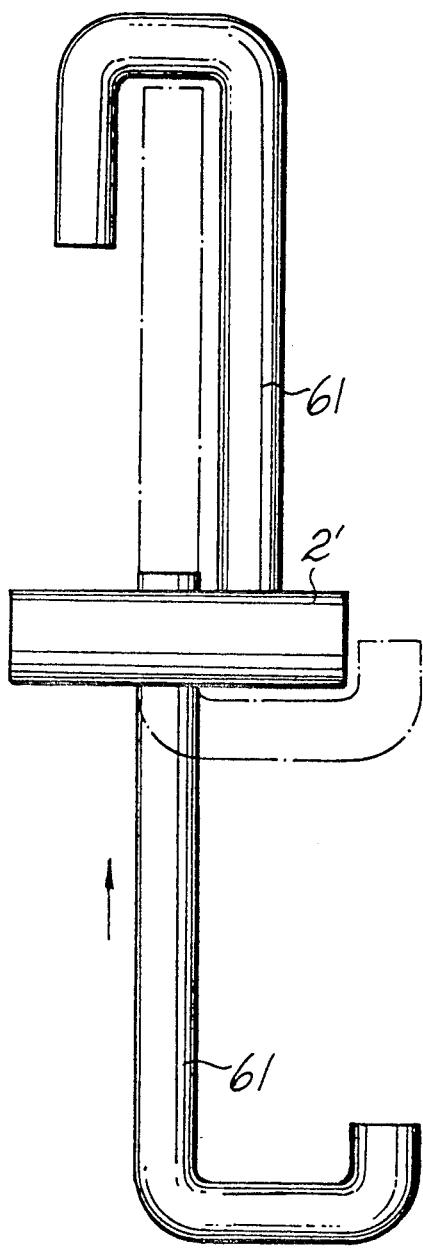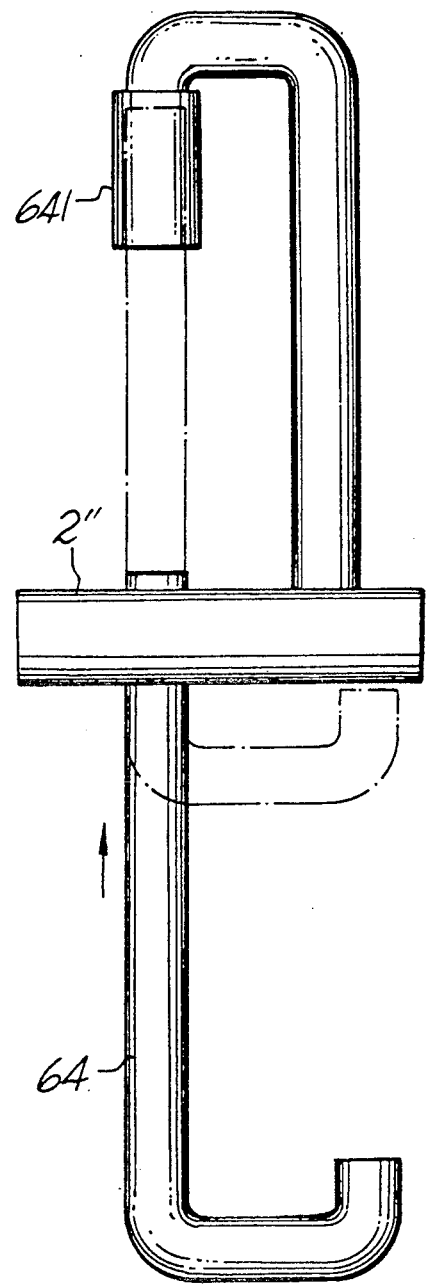

PADLOCK DEVICE LOCKABLE BY PUSHING

BACKGROUND OF THE INVENTION

1. Field of the Invention

This invention relates to a lock device with a push rod which can be pushed to lock the device.

2. Description of the Related Art

Referring to FIGS. 1 and 2, a conventional lock device for bicycles and motorcycles includes a tubular rod body (10) and a shackle (11) with two legs extending into the lock holes (101) of the rod body (10). The rod body (10) has a projection (102) which is well-matched with a notch of the curved end of the shackle (10) so as to retain the shackle (11) on the rod body (10). The other end of the shackle (11) is straight and is provided with a protrusion (110). When the lock device is in its locked position, an L-shaped retaining piece (12) is at the position indicated by solid lines in FIG. 1 and limits the projection (110) of the shackle (11) in the rod body (10). When one desires to open the lock device, an associate key is inserted into the device and is operated so as to move the retaining piece (12) to the position indicated by phantom lines (A) in FIG. 1. Subsequently, the straight end of the shackle (11) is pulled upward to the position indicated by phantom lines (B) in FIG. 1. The conventional lock device suffers from the following disadvantages:

(1) After unlocking, the key remains in the rod body (10) until the device is locked, resulting in an awkward operation.
(2) When assembling the shackle (11) with the rod body (10), the straight end of the shackle (11) can be inserted into the rod body (10) only after the curved end (111) has been inserted into the same. This forms a time-consuming two-step assembling operation.
(3) The positions of the two legs of the shackle (11) in the rod body (10) are not interchangeable.
(4) Because the curved end (111) of the shackle (11) is retained on the rod body (10), it is difficult to mount the lock device in place on something to be locked.
(5) When the lock device is in the locked position, a destroyer may use force to pull the straight end of the shackle (11) to separate from the rod body (10) due to the fact that the upper end of the retaining piece (12) is located above a curved surface of the shackle (11). This destruction-resisting effect is required to improve.

SUMMARY OF THE INVENTION

An object of this invention is to provide a lock device with a push rod which can be pushed to lock the device so that the associate key is retained on the device only when the device is being opened, thereby increasing the applications of the device.

Another object of this invention is to provide a lock device the shackle of which is difficult to pull from the device by use of force.

Still another object of this invention is to provide a lock device which can be easily sleeved on something to be locked.

According to this invention, a lock device includes a hollow cylindrical rod body with two through holes formed through a wall thereof. The rod body has a closed end and an open end. A key plug assembly includes a tubular outer housing, which is fixed in the open end of the rod body and which has an inner end and an outer end, and a push rod extending through the outer housing and movable in the outer housing between an unlocking position, where a portion of the push rod extends from the outer end of the outer housing, and a locking position, where the push rod extends from the inner end of the outer housing. In the rod body, a resilient element pushes an elongated locking plate assembly toward the key plug assembly. When the push rod is pushed inward and is locked in the locking position in the outer housing, the resilient element is compressed between the locking plate assembly and the end wall of the rod body so that two notched lock bars extend through the through holes of the rod body and the small-sized portions of the locking holes in the locking plate assembly, thereby preventing removal of the lock bars from the rod body. When an associated key is inserted into the open end of the rod body and is operated so that the push rod is unlocked from the outer housing, the resilient element pushes the push rod to the unlocking position so as to engage the lock bars within the large-sized portions of the locking holes of the locking plate assembly, thereby allowing the lock bars to be removed from the rod body.

BRIEF DESCRIPTION OF THE DRAWINGS

Other features and advantages of this invention will become apparent in the following detailed description of the preferred embodiments of this invention, with reference to the accompanying drawings, in which:

FIGS. 4 and 5 illustrate the locking position of the lock device;

FIG. 6 is an exploded view of the key plug assembly of the lock device according to this invention; and FIGS. 7, 8 and 9 illustrate other embodiments of this invention.

DETAILED DESCRIPTION OF THE PREFERRED EMBODIMENTS

Figure 1:
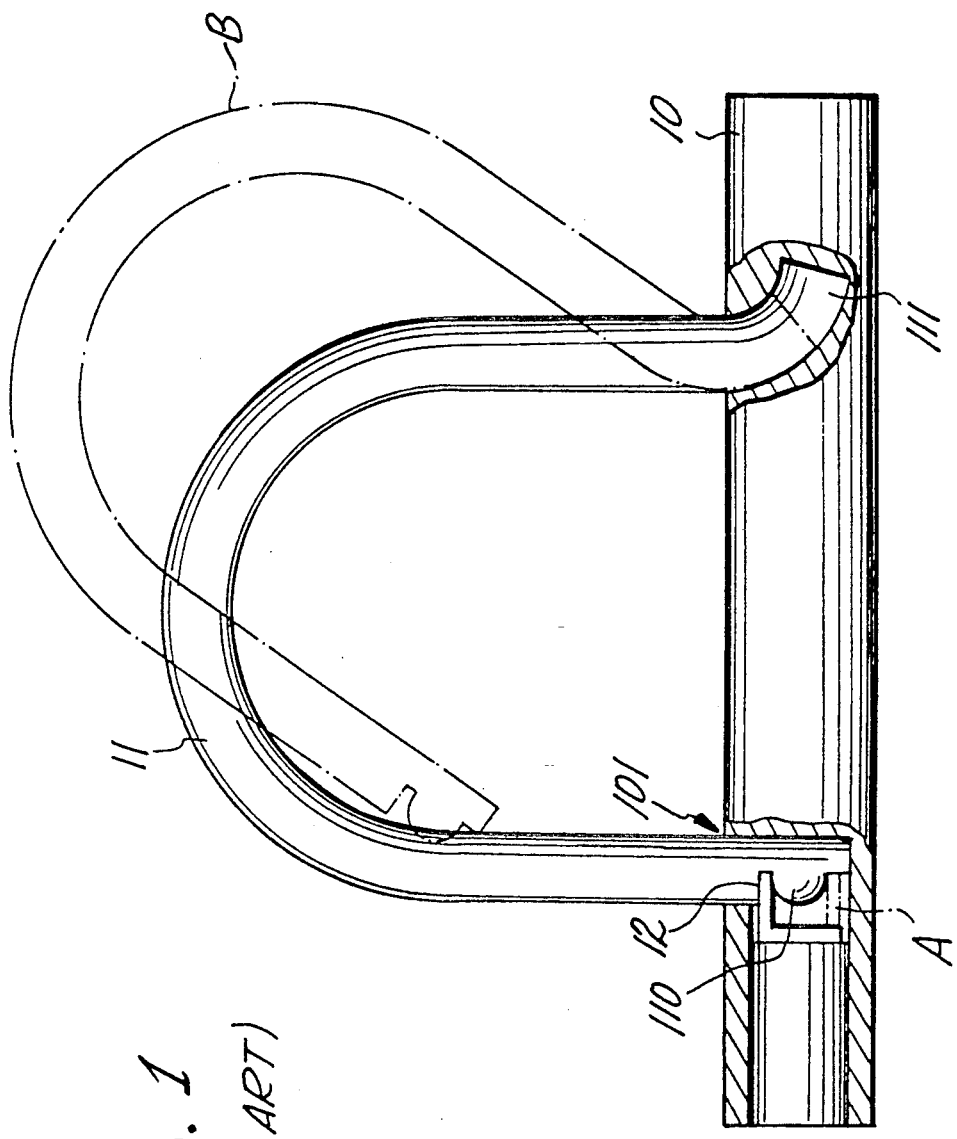
FIGS. 1 and 2 illustrate a conventional lock device.
Figure 2:
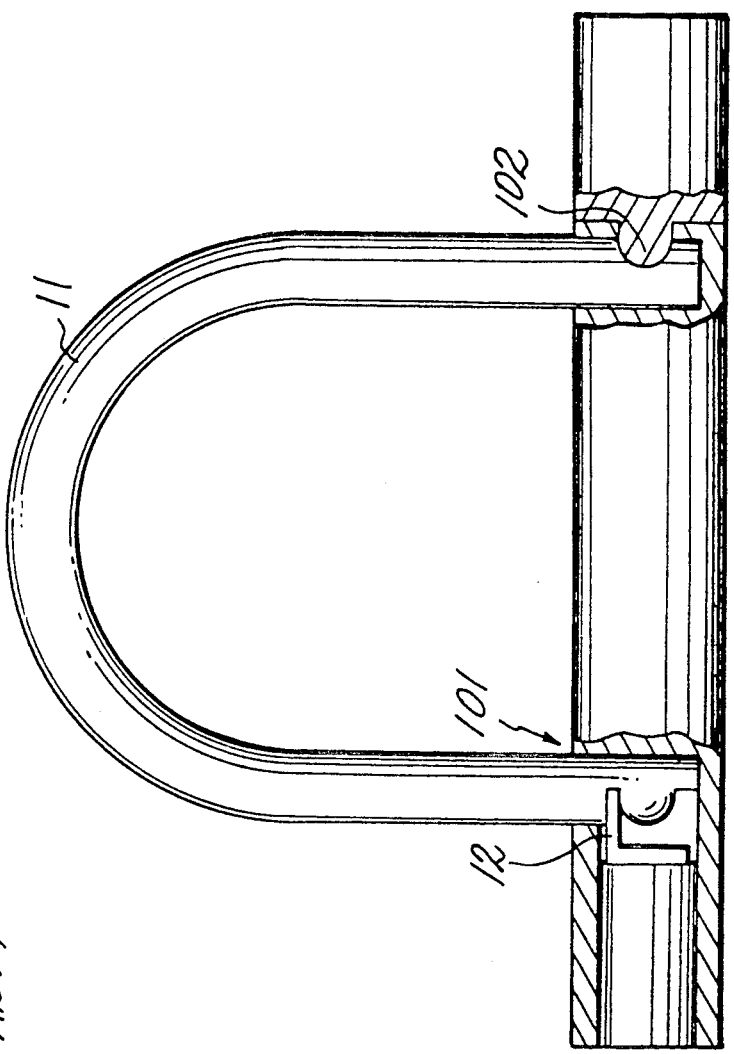
Figure 3:
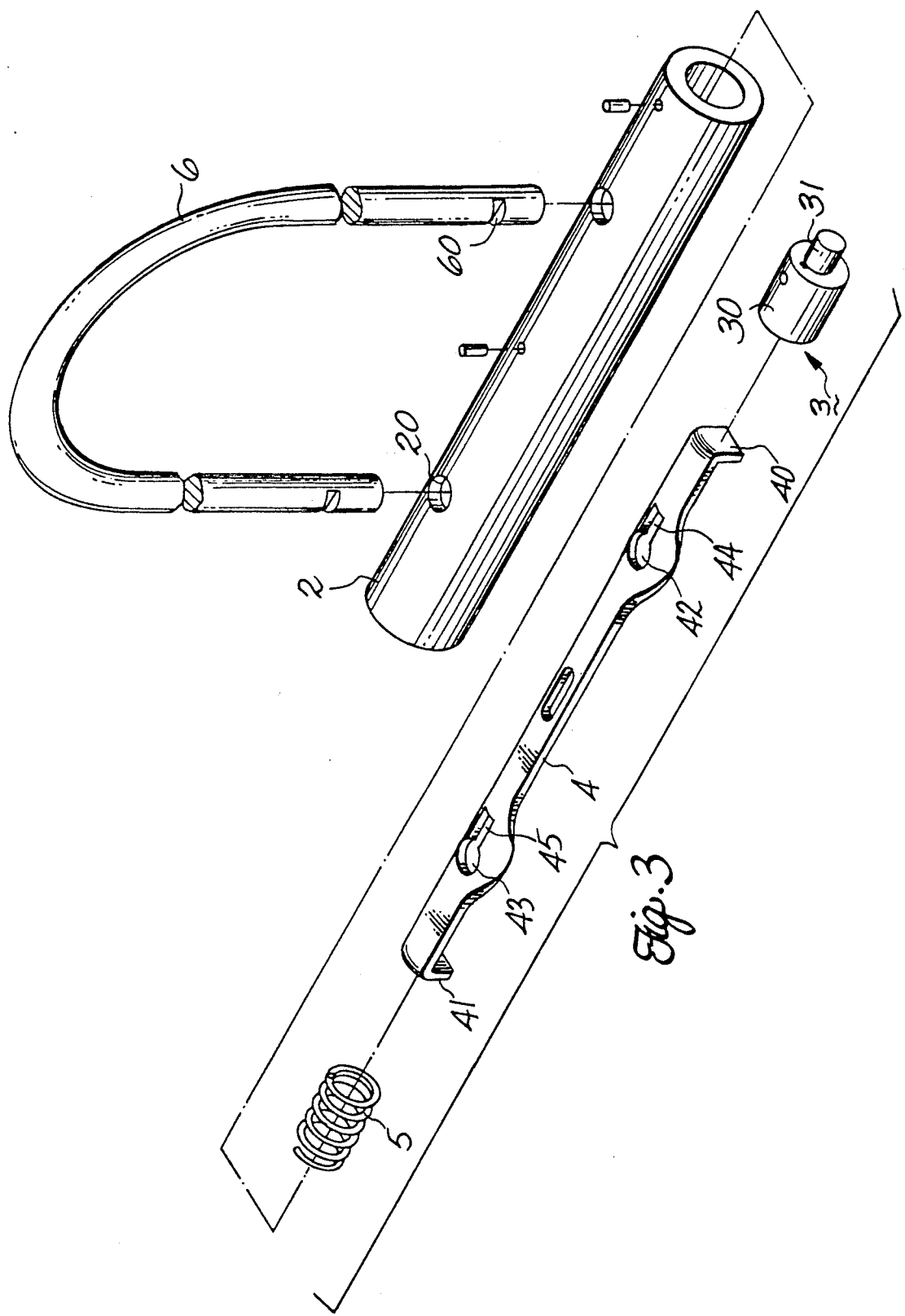
FIG. 3 is an exploded view of a lock device according to this invention.

Referring to FIG. 3, a lock device of this invention includes a hollow cylindrical rod body (2) having an open end and a closed end, a key plug assembly (3) disposed in the open end of the rod body (2), an elongated locking plate assembly (4) pushed toward the key plug assembly (3) by a resilient element (5), and a lock bar assembly (6). In this embodiment, the resilient element (5) is a coiled compression spring (5) which is placed between the locking plate assembly (4) and the end wall of the rod body (2). The lock bar assembly (6) is a shackle which has two parallel legs with aligned notches (60).

The rod body (2) has two axially aligned retaining holes (20) which are formed through a wall thereof. The key plug assembly (3) includes a tubular outer housing (30) fixed in the rod body (2), and a push rod (31) extending through and movable in the outer housing (30). The locking plate assembly (4) has a first vertical end wall (40) abutting against the key plug assembly (3), a second vertical end wall (41) abutting against the acting or pushing end of the resilient element (5), and two locking holes formed through the locking plate assembly (4). Each of the locking holes has a large-sized circular portion (42, 43) and a small-sized rectangular portion (44, 45). The shackle (6) has two parallel legs with aligned bar notches (60). The legs of the shackle (6) extend through the retaining holes (20) of the rod body (2) and the locking holes of the locking plate assembly (4). The lower ends of the legs of the shackle (6) rest on the inner surface of the rod body (2) in such a manner that the bar notches (60) are aligned with the locking holes of the locking plate assembly (4).

Referring to FIG. 4, the push rod (31) can be moved between the locking position indicated by the solid lines and the unlocking position indicated by the phantom lines. FIG. 5 is a sectional view illustrating the locking position of the push rod (31). When in the locking position, the push rod (31) partially extends from the inner end of the outer housing (30) and is locked in the outer housing (30) in a manner that will be described hereinafter. This extension of the push rod (31) moves the locking plate assembly (4) to the left so as to engage the legs of the shackle (6) in the small-sized portions of the locking holes in the locking plate assembly (4), thereby compressing the resilient element (5) between the locking plate assembly (4) and the left end wall of the rod body (2). Accordingly, the shackle (6) cannot be removed from the rod body (2).

When an associated key is inserted into the open end of the rod body (2) and is operated so as to unlock the push rod (31) from the outer housing (30), the resilient element (5) moves to a stretched position indicated by phantom lines (C) so as to move the locking plate assembly (4) and the push rod (31) to the unlocking position indicated by phantom lines (D), where the right end portion of the push rod (31) extends from the outer end of the outer housing (30).

The key plug assembly (3) further includes a rotatable hollow cylinder (32), a fixed hollow cylinder (33), several tumbler units (34) and two spring-loaded retaining elements (351), as shown in FIG. 6. The outer housing (30) has a radially inward flange in which a key hole (301) is defined. A pin (302) is passed through the hole (303) of the outer housing (30) and the hole (330) so as to secure the fixed hollow cylinder (33) to the outer housing (30).

The push rod (31) has two rod notches (310) and an axially extending slide slot (311). A guide pin (312) extends through the hole (320) of the rotatable hollow cylinder (32) and the slide slot (311) of the push rod (31) so as to retain the push rod (31) on the lock device in such a manner that the push rod (31) can slide relative to the rotatable hollow cylinder (32).

The retaining elements (351) are retained in the accommodating bores (331) of the fixed hollow cylinder (33) and are biased by a spring (350) to press against the outer surface of the push rod (31). One can push the outer end of the push rod (31) to move inward until the retaining elements (351) engage with the rod notches (310) of the push rod (31). The engagement of the retaining elements (351) in the rod notches (310) locks the push rod (31) in the outer housing (30) so as to locate the push rod (31) in the locking position.

Several axial bores (321) are formed through the rotatable hollow cylinder (32). The fixed hollow cylinder (33) also has several axial bores (332) formed in an end surface thereof in alignment with the bores (321) of the rotatable hollow cylinder (32). Each of the tumbler units (34) is received in the bores (321, 332) and consists of a first tumbler pin (341) positioned in the bore (321) of the rotatable hollow cylinder (32), a second tumbler pin (342) spanning a shear line between the fixed hollow cylinder (33) and the rotatable hollow cylinder (32), and a tumbler spring (343) biasing the first tumbler pin (341) to extend from the bore (321). The first tumbler pins (341) have different lengths.

When one desires to open the lock device, an associated key (not shown) is inserted into the key hole (301) of the outer housing (30) so as to engage the first tumbler pins (341) with the key cuts of the key, thereby positioning the first and second tumbler pins (341, 342) of each of the tumbler units (34) on two sides of the shear line between the fixed hollow cylinder (33) and the rotatable hollow cylinder (32). At this time, the engagement of the first tumbler pins (341) in the key cuts enables synchronous rotation of the rotatable hollow cylinder (32) and the key. Subsequently, the key is turned to rotate the push rod (31) synchronously with the rotatable hollow cylinder (32) so as to disengage the spring-loaded retaining elements (351) from the rod notches (310) of the push rod (31). As a result, the inner end of the push rod (31) is pushed by the resilient element (5) into the outer housing (30) so as to urge the outer end of the push rod (31) to extend from the outer housing (30).

FIG. 7 shows the second embodiment of this invention. As illustrated, the lock bar assembly of the lock device consists of two J-shaped lock bars (61). The rod body (2') has two through holes formed therethrough so that the lock bars (61) can extend therethrough. When the lock device is not in use, the push rod (not shown) may be moved to the unlocking position so that one of the lock bars (61) can be moved from the position indicated by solid lines to the position indicated by phantom lines, thereby reducing the volume of the lock device for storage.

Figure 8:
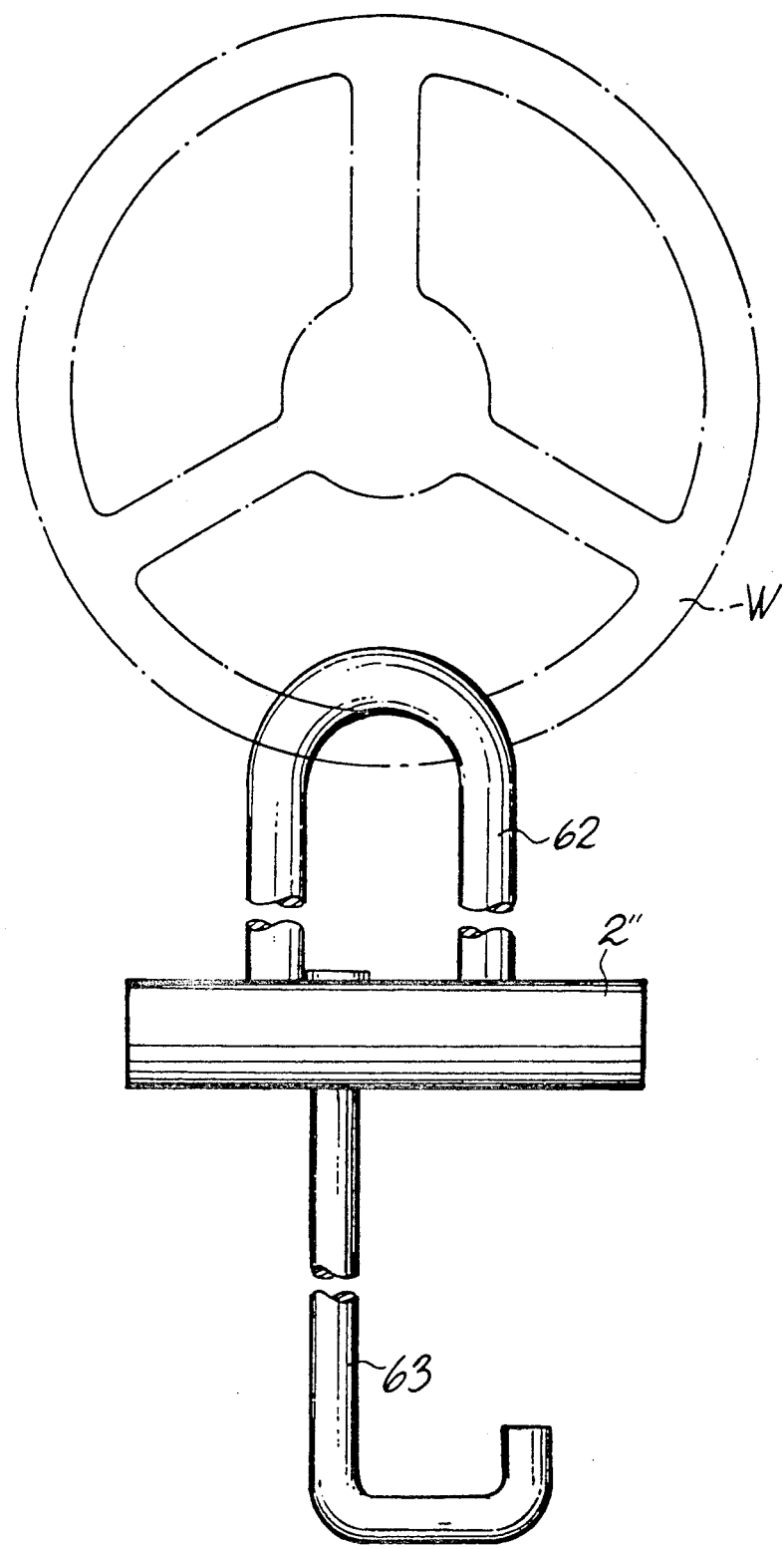

FIG. 8 shows the third embodiment of this invention. In this embodiment, the lock bar assembly of the lock device consists of a shackle (62) and a J-shaped lock bar (63) which are located on two opposite sides of the rod body (2"). The shackle (62) is sleeved on the rim of the steering wheel (W) of an automobile. The J-shaped lock bar (63) hooks over a brake plate (not shown).

FIG. 9 shows the fourth embodiment of this invention which is similar to the second embodiment in construction except that the upper J-shaped lock bar has an enlarged upper end portion (641) and that the lower J-shaped lock bar (64) extends through the rod body (2''') at a position aligned with the enlarged upper end portion (641) of the upper J-shaped lock bar. The lower J-shaped lock bar (64) can be moved upward into the enlarged end portion (641) of the upper J-shaped lock bar at the upper end thereof when unlocked from the lock bar (2''').

The lock device of this invention has a number of applications. For example, the lock device can be used on the steering wheel of an automobile, motorcycles, bicycles, etc.

With this invention thus explaine, it is apparent that numerous modifications and variations can be made without departing from the scope and spirit of this invention. It is therefore intended that this invention be limited only as indicated in the appended claims.

I claim:
1. A lock device comprising:
   a hollow cylindrical rod body having a plurality of retaining holes formed through a wall thereof, a closed end and an open end;
   a key plug assembly including a tubular outer housing fixed in the open end of said rod body and having an inner end and an outer end, and a push rod extending through said outer housing, said push rod being locked in a locking position in said outer housing where a portion of said push rod extends from said inner end of said outer housing, said push rod being capable of being moved to an unlocking position where a portion of said push rod extends from said outer end of said outer housing when said push rod is unlocked from said outer housing;

an elongated locking plate assembly placed in said rod body between said closed end of said rod body and said key plug assembly and having an end abutting against an end of said key plug assembly so that inward pushing of said push rod impels said locking plate assembly inward, and a plurality of locking holes formed through said locking plate assembly and respectively aligned with said retaining holes of said rod body, each of said locking holes having a small-sized portion and a large-sized portion;

a lock bar assembly consisting of a plurality of lock bars respectively extending through said retaining holes of said rod body and said locking holes of said locking plate assembly, each of said lock bars having a bar notch formed therein which is aligned with one of said locking holes of said locking plate assembly, said lock bars being engaged within said small-sized portions of said locking holes when said push rod is in the locking position so as to limit said lock bars in said locking holes, thereby preventing removal of said lock bars from said rod body; and a resilient element mounted between said closed end of said rod body and said locking plate assembly so as to bias said locking plate assembly to move toward said open end of said rod body, thereby positioning said lock bars within said small-sized portions of said locking holes of said locking plate assembly;

whereby, when a key is inserted into said open end of said rod body and is rotated, said push rod is unlocked from said outer housing so that said resilient element pushes said locking plate assembly to locate said lock bars within said large-sized portions of said locking holes, thereby moving said push rod to the unlocking position.

2. A lock device as claimed in claim 1, wherein said locking plate assembly has two vertical end walls so as to enable easy synchronous movement of said push rod, said locking plate assembly and an acting end of said resilient element which abuts against said locking plate assembly.

3. A lock device as claimed in claim 1, wherein said key plug assembly includes:

said outer housing;

a fixed hollow cylinder secured in said outer housing and having several axial bores formed in an end surface of said fixed hollow cylinder;

a rotatable hollow cylinder, mounted rotatably in said outer housing, abutting against and coaxial with said fixed hollow cylinder, including several axial bores formed through said rotatable hollow cylinder in alignment with said bores of said fixed hollow cylinder, and a guide pin mounting securely on said rotatable hollow cylinder;

said push rod being disposed rotatably in said outer housing and having an axially extending slide slot formed in said push rod so that said guide pin is received slidably in said slide slot, and a rod notch formed in said push rod, engagement of said guide pin in said slide slot enabling synchronous rotation of said rotatable hollow cylinder and said push rod;

a spring-loaded retaining element provided on said fixed hollow cylinder and biased to press against said push rod, said retaining element being engaged within said rod notch of said push rod when said push rod is in the locking position; and several tumbler units respectively received in said bores of said fixed and rotatable hollow cylinders, each of said tumbler units consisting of a first tumbler pin positioned in said rotatable hollow cylinder, a second tumbler pin spanning a shear line between said fixed and rotatable hollow cylinders, and a tumbler spring positioned in said fixed hollow cylinder so as to bias said first tumbler pin to extend from said bore of said rotatable hollow cylinder, at least two of said first tumbler pins having different lengths;

whereby, when said outer end of said push rod is pushed into said outer housing so as to engage said retaining element in said rod notch of said push rod, said push rod is locked in said outer housing so as to locate said lock bars of said lock bar assembly within said small-sized portions of said locking holes of said locking plate assembly, thereby preventing removal of the lock bars from said rod body; when said push rod is in the locking position, insertion and rotation of an associated key into said lock device locate said first and second tumbler pins of each of said tumbler units on two sides of the shear line so that said push rod rotates synchronously with said rotatable hollow cylinder, thereby disengaging said retaining element from said rod notch of said push rod, disengagement of said retaining element from said rod notch of said push rod causing said push rod to extend from said outer end of said outer housing.

4. A lock device as claimed in claim 1, wherein said rod body has two axially aligned said retaining holes, said locking plate assembly having two axially aligned said locking holes, said lock bar assembly including a shackle having two parallel legs, each of which rests on an inner wall of said rod body, said legs constituting said lock bars.

* * * * *